United States Patent [19]

Chen et al.

[11] 4,328,331

[45] May 4, 1982

[54] NOVEL POLYESTER-AMIDES

[75] Inventors: Augustin T. Chen, Cheshire; Robert G. Nelb, II; Kemal B. Onder, both of North Haven, all of Conn.

[73] Assignee: The Upjohn Company, Kalamazoo, Mich.

[21] Appl. No.: 255,632

[22] Filed: Apr. 20, 1981

[51] Int. Cl.³ .............................................. C08G 63/44
[52] U.S. Cl. .................................... 528/288; 525/425; 525/444; 528/291; 528/292
[58] Field of Search ................ 525/425, 444; 528/288, 528/291, 292

[56] References Cited

U.S. PATENT DOCUMENTS

| | | | |
|---|---|---|---|
| 3,396,151 | 8/1968 | Caldwell | 260/78 |
| 3,502,602 | 3/1970 | Helm et al. | 525/425 |
| 3,527,860 | 9/1970 | Watson et al. | 264/210 |
| 3,655,821 | 4/1972 | Lofquist et al. | 525/444 |
| 3,828,010 | 8/1974 | Davis et al. | 260/75 |
| 4,045,511 | 8/1977 | Nickol | 260/857 TW |
| 4,045,512 | 8/1977 | Thompson et al. | 260/857 TW |
| 4,237,251 | 12/1980 | Ishimaru et al. | 525/444 |

*Primary Examiner*—Lucille M. Phynes
*Attorney, Agent, or Firm*—Denis A. Firth; John Kekich

[57] ABSTRACT

Segmented thermoplastic polyester-amides are described which are prepared by reacting a polymeric diol (molecular weight in the range of 400 to 4000) with a carboxylic acid terminated prepolymer obtained by reacting an aliphatic ether diamine, optionally in admixture with a minor proportion (based on equivalents) of an alkylene diamine, with an excess of dicarboxylic acid (aromatic or aliphatic). The polyester-amides, which can be prepared preferably by the melt condensation method, have excellent physical properties and resistance to degradation by heat.

12 Claims, No Drawings

NOVEL POLYESTER-AMIDES

BACKGROUND OF THE INVENTION

1. Field of the Invention

This invention relates to novel polymers and is more particularly concerned with novel polyester-amides and with processes for their preparation.

2. Description of the Prior Art

The preparation of polyamides from aliphatic diamines having ether linkages in the carbon chain is well-known in the art; see, for example, U.S. Pat. Nos. 3,396,151; 3,527,860; and 4,045,511/2. Such polyamides are generally useful as fiber forming polymers but are not elastomeric in nature.

U.S. Pat. No. 3,828,010 describes the preparation of water-dispersable products, useful as sizing agents, adhesives and the like, by reaction of aliphatic dicarboxylic acids, low molecular weight glycols, and aliphatic diamines containing ether linkages in the carbon chain.

We have now found that products having highly useful properties, including in particular thermoplasticity and resistance to deformation by heat over an extended range of temperatures, are segmented polymers in which the hard segments comprise polyamides derived from aliphatic diamines having ether linkages in the chain and the soft segments are derived from conventional polyether or polyester diols.

SUMMARY OF THE INVENTION

This invention comprises segmented thermoplastic polyester-amides characterized by a recurring unit of the formula:

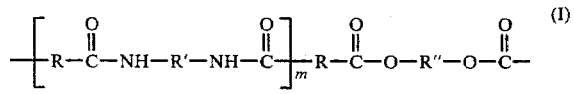

wherein

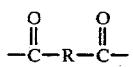

is the residue of a dicarboxylic acid selected from the class consisting of arylene dicarboxylic acids, alkylene dicarboxylic acids and arylenebis(alkanoic acids);

from 50 to 100 percent of the R' groups in said recurring unit represent the residue of a diamine having the formula:

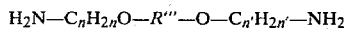

wherein $C_nH_{2n}$ and $C_{n'}H_{2n'}$ are each independently alkylene from 3 to 5 carbon atoms and R''' is alkylene having from 1 to 6 carbon atoms separating the valencies;

from 50 to 0 percent of the R' groups in said recurring unit represent the residue of at least one aliphatic diamine having from 2 to 12 carbon atoms;

R'' is the residue of a polymeric diol HO—R''—OH (IV) having a molecular weight from about 400 to about 4000; and m is a number having an average value from about 1 to about 20.

The inention also comprises a process for the preparation of the aforesaid polyester-amides by a melt polymerization technique.

The term "arylene dicarboxylic acids" means aromatic hydrocarbons having two carboxylic acid groups attached directly to nuclear carbon atoms and is inclusive of phthalic acid, isophthalic acid, terephthalic acid, diphenylene-4,4'-dicarboxylic acid, 1,5-naphthalenedicarboxylic acid, and the like.

The term "alkylene dicarboxylic acids" means acids represented by the formula HOOC—alkylene—COOH wherein alkylene is straight chain or branched and contains from 4 to 12 carbon atoms. Illustrative of such acids are adipic, pimelic, suberic, azelaic, sebacic, 1,11-undecandioic acid, 1,12-dodecandioic acid, α-methyladipic, α,α-dimethyladipic, α-ethylpimelic, α-ethyl-α-methylpimelic, 2,2,4-trimethyladipic, α,α-dimethylazelaic, and α,α,α',α'-tetramethylsebacic acids.

The term "arylenebis(alkanoic acids)" means acids of the formula HOOC—R—COOH wherein R represents alkylene which has an arylene group (i.e. a radical derived by removing two nuclear hydrogen atoms from an aromatic hydrocarbon) interposed between two adjoining aliphatic carbon atoms in the alkylene chain. Illustrative of such acids are o-, m-, and p-phenylenebis(acetic acid), o-, m- and p-phenylenebis(propionic acid), o-, m- and p-phenylenebis(isobutyric acid) and the like.

The term "alkylene from 3 to 5 carbon atoms" which is used to define the groups $C_nH_{2n}$ and $C_{n'}H_{2n'}$ is inclusive of straight and branched chain alkylene groups such as

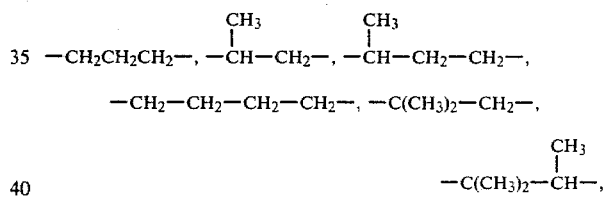

and the like.

The term "alkylene from 2 to 6 carbon atoms" is inclusive of straight and branched chain alkylene groups such as ethylene, 1,2-propylene, 1,3-propylene, 1,4-butylene, 2-ethyl-1,4-butylene, 2-ethyl-1,6-hexylene, 2,3-dimethyl-1,5-pentylene, 1,1,4,4-tetramethyl-tetramethylene, and the like.

The term "aliphatic diamine" means diamines represented by the formula $H_2N$—alkylene—$NH_2$ (V) wherein alkylene is straight chain or branched and contains from 2 to 12 carbon atoms. Illustrative of such diamines are ethylenediamine, 1,2-propylenediamine, 1,3-propylenediamine, 1,4-butylenediamine, 1,8-octylenediamine, 1,2-hexylenediamine, 1,10-decylenediamine, 1,12-dodecylenediamine, 1,6-hexylenediamine, 2-ethyl-1,6-hexylenediamine, 2-ethyl-1,4-butylenediamine, and the like.

The term "polymeric diol" is inclusive of polyether and polyester diols having molecular weights within the stated range as will be discussed and exemplified further hereinafter.

DETAILED DESCRIPTION OF THE INVENTION

The polyester-amides of the invention are prepared by a two-step procedure. In the first step of the procedure there is prepared a carboxylic acid-terminated polyamide by reacting an ether diamine of the formula (II) above with an amount in excess of equimolar of a dicarboxylic acid HOOC—R—COOH (III) wherein R is as hereinbefore defined. The exact amount of the excess of dicarboxylic acid (II) is generally such that the molar proportions of dicarboxylic acid to ether diamine are in the range of about 2.5:1 to about 1.1:1.

The reaction between the dicarboxylic acid (III) and the ether diamine (II) can be carried out by any of the procedures conventional in the art. Preferably the reaction is carried out by heating the reactants together in the molten state and distilling out the water of condensation which is eliminated in the reaction. Advantageously the reaction is carried out at or above the melting point of the mixture of reactants and generally in the range of about 150° C. to about 300° C. The progress of the reaction can be followed by routine analytical techniques such as measuring the amount of water eliminated in the reaction, following the formation of amide linkages by infrared or nuclear magnetic resonance spectroscopy, end group analysis and like techniques. When the reaction is adjudged complete, the reaction mixture is allowed to cool to room temperature and generally requires no further treatment prior to being used in the next step of the process of the invention.

In a less preferred embodiment of this step of the process of the invention the reaction between the dicarboxylic acid (III) and the ether diamine (II) is carried out in the presence of an inert organic solvent, i.e. a solvent which does not enter into reaction with either of the reactants or otherwise interfere with the desired course of the reaction. Illustrative of inert organic solvents are benzene, toluene, xylene, chlorobenzene, dichlorobenzene and the like. The reaction is preferably carried out under reflux conditions and the water of condensation is removed from the reaction mixture by azeotropic distillation, advantageously on a continuous basis. The progress of the reaction is followed conveniently by measuring the amount of water so removed. When the reaction is adjudged complete, the desired carboxylic acid-terminated prepolymer is isolated from the reaction mixture, if desired, by conventional means. Illustratively, the inert organic solvent is removed by distillation leaving the prepolymer as the undistilled residue. Alternatively, the reaction product containing inert organic solvent from the above condensation can be carried forward to the next stage of the process of the invention without isolation of the prepolymer.

In the second step of the process of the invention, the reaction is preferably carried out, in the absence of an inert organic solvent, by heating together the carboxylic acid-terminated prepolymer (prepared as described above) and a polymeric diol (IV) at a temperature in the range of about 200° C. to about 300° C. and preferably from about 230° C. to about 280° C. Preferably, the reaction is carried out in the presence of a catalyst which latter can be any of those conventionally employed in the preparation of polyesters. Illustrative of such catalysts are tetrabutyl orthotitanate, tetraisopropyl orthotitanate, antimony trioxide, p-toluenesulfonic acid, calcium acetate, zinc acetate, and the like. The polycarboxylic acid-terminated prepolymer and the polymeric diol are employed in approximately stoichiometric proportions in the reaction. The progress of the reaction is followed by conventional analytical procedures such as by measuring the amount of water of condensation which distils out of the reaction mixture. When the reaction is adjudged complete, the reaction product is allowed to cool to room temperature (circa 20° C.) and solidify. Alternatively, if the reaction has been carried out using the less preferred feature of employing an inert organic solvent, the desired polymer can be recovered from the final reaction mixture by pouring the latter into a solvent, such as methanol, ethanol, hexane, water and the like, in which the polymer is insoluble. The precipitate so obtained is then isolated by filtration or by decanting away the solvent and can be washed, if desired, before being dried and, if desired, comminuted by chopping, grinding, crushing and the like procedures to yield material which is in appropriate form for subsequent molding.

Illustrative of the ether diamines (II), which are employed in the first step of the above-described process of the invention and all of which are known, are 1,3-bis(3-aminopropoxy)propane,
1,4-bis(3-aminopropoxy)butane,
1,2-bis(3-aminopropoxy)ethane,
1,2-bis(3-amino-2-methylpropoxy)ethane,
1,3-bis(3-amino-2-methylpropoxy)propane,
1,4-bis(3-amino-2-methylpropoxy)butane,
1,2-bis(2-aminopropoxy)propane,
1,3-bis(4-aminobutoxy)propane,
1,3-bis(3-aminopropoxy)butane,
1,5-bis(3-aminopropoxy)pentane,
1,6-bis(3-aminopropoxy)hexane,
1-(3-(aminobutoxy)-4-(3-aminopropoxy)butane,
2,2-dimethyl-1,3-bis(3-aminopropoxy)propane,
2,3-bis(3-aminopropoxy)butane,
2,4-dimethyl-2,4-bis(3-aminopropoxy)hexane,
bis-(2-aminoisobutoxy)methane,
bis-(2-aminobutoxy)methane, and
1,1-bis-(2-aminoisobutoxy)-2-methylpropane While any of the ether diamines of formula (II) can be employed in synthesising the polyester-amides of the invention it is preferred to employ those ether diamines in which the alkylene group R''' contains at least 2 carbon atoms in the chain and, most preferably, at least 3 carbon atoms in the chain. A preferred group of ether diamines of the formula (II) encompasses 1,3-bis(3-aminopropoxy)propane, 1,4-bis(3-aminopropoxy)butane, 1,3-bis(3-amino-2-methylpropoxy)propane, and 1,4-bis(3-amino-2-methylpropoxy)butane.

The polymeric diols (IV) which are employed in the second step of the above-described process of the invention can be any polyether or polyester diols having molecular weights in the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and the like alkylene oxides with homopolymers of conjugated alkadienes such as butadiene, isoprene and the like and copolymers of said alkadienes with vinyl monomers such as acrylonitrile, methacrylonitrile, styrene, and the like. Particularly preferred polyether diols for use in preparing the polyester amides of the invention are polytetramethylene glycols.

Illustrative of polyester diols of the formula (II) are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol and the like including mixtures of two or more such diols. The polyester diols which can be employed are also inclusive of polycaprolactones.

In addition to being used individually, any two or more of the above-described and illustrated polymeric diols (IV) can be employed in admixture in preparing the polyester-amides of the invention. As previously stated the polymeric diols (IV) can have molecular weights in the range of 400 to 4000. Preferably, the polymeric diols have molecular weights in the range of 1000 to 3000.

The dicarboxylic acids (III) employed in the process of the invention can be any of those described and exemplified hereinabove. Particularly preferred dicarboxylic acids are terephthalic acid and isophthalic acid.

In a particular embodiment of the invention the ether diamine (II) is employed in combination with an aliphatic diamine (V), as hereinbefore defined and exemplified, provided that the ether diamine (II) is employed in the combination as the major component, based on equivalents of the diamines. When a combination of two or more such diamines is employed in the first step of the above-described process of the invention, the diamines can be added separately to the reaction mixture or can be preblended and added as a blend to the reaction mixture.

The polyester-amides of the invention have melt-temperatures of the order of 180° C. to 250° C. and are ideally suited for injection molding or compression molding to produce articles such as bushings, seal faces, compressor vanes, impellers, pistons and piston rings, gears, thread guides, cams, brake linings, clutch faces, abrasive articles, and the like. The physical properties of the polyester-amides of the invention, particularly the structural strength and resistance to degradation by heat, are very satisfactory for the various uses outline above.

The following examples describe the manner and process of making and using the invention and set forth the best mode contemplated by the inventors of carrying out the invention but are not to be construed as limiting.

EXAMPLE 1

(a) A mixture of 50 g. (0.49 equivalents) of 1,4-bis(3-aminopropoxy)butane and 49.3 g. (0.59 equivalents) of terephthalic acid was heated to 235° C. and maintained thereat under a slow stream of nitrogen. Distillation of water commenced after the mixture had become molten and distillation continued for a period of about 1 hour after which the rate of distillation of the water slowed considerably. At this time the temperature of the oil bath surrounding the reaction mixture was raised to 260° C. and held at that temperature for another 30 minutes. At the end of this time the heating was discontinued and the molten product was poured into a Teflon-lined tray and allowed to cool to ambient temperature (circa 20° C.) There was thus obtained a carboxylic acid-terminated prepolymer having melting endotherms at 199° C. and 203° C. and an equivalent weight of 976 (average of three determinations), corresponding to the formula:

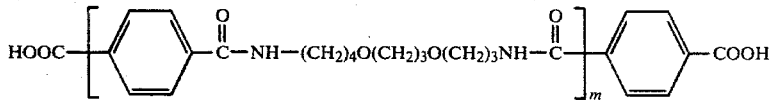

where m has an average value of about 5.

(b) A mixture of 30 g. (0.03 equivalents) of the carboxylic acid-terminated prepolymer prepared as described above, 14.87 g. (0.03 equivalents) of a poly(hexamethylene)adipate [Rucoflex S105-110; Hooker; M.W.=990] and 0.45 g. of an antioxidant [Irganox 1098; Ciba-Geigy Corporation] was heated to 210° C. under an atmosphere of nitrogen. When the mixture was completely molten, 0.5 g. of tetrabutyltitanate was added. Reaction started immediately thereafter and distillation of water from the reaction mixture began. After heating at 210° C. for a further 30 minutes, the temperature was gradually increased to 240° C. and the pressure was reduced to facilitate removal of water. After heating at 240° C. for 2 hours the distillation of water had stopped and the temperature was then raised to 265° C. for 30 minutes. At the end of this time the molten reaction product was poured into a Teflon-lined tray and allowed to cool to ambient temperature (circa 20° C.).

The resulting solid polymer was then chopped to facilitate molding. There was thus obtained a polyester-amide having an intrinsic viscosity (0.5 g. in 100 ml. of N-methylpyrrolidone at 30° C.) of 1.08 and characterized by the following recurring unit:

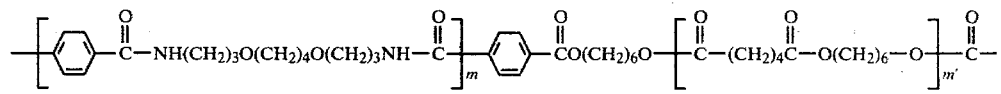

wherein m and m' are numbers having an average value of 5 and 4.5, respectively.

A sample of the above polyester-amide was compression molded at 210° C. to give an opaque sheet which was found to have the following properties:

| | |
|---|---|
| Hardness: Shore D: 52 | |
| Modulus at | |
| 50%: | 1820 psi |
| 100%: | 1863 psi |
| 300%: | 2268 psi |
| *Elongation at break: | 300% |
| *Tensile strength: | 2268 psi |
| *Tensile Set: | 120% |

*Tests carried out in accordance with ASTM638-68.

EXAMPLE 2

(a) A mixture of 45 g. (0.441 equivalents) of 1,4-bis(3-aminopropoxy)butane, 8.54 g. (0.147 equivalents) of hexamethylene diamine and 59.59 g. (0.717 equivalents) of terephthalic acid was gradually heated to 230° C. When the mixture had melted the distillation of water began and continued for approximately one hour before slowing down markedly. At this time the temperature of the oil-bath surrounding the reaction mixture was increased to 260° C. and maintained thereat for another hour. At the end of this time the reaction product was poured on to a Teflon-lined tray and allowed to cool to ambient temperature (circa 20° C.). There was thus obtained a carboxylic acid-terminated prepolymer having a glass transition temperature at 69° C., melting exotherms at 175° C. and 225° C., an equivalent weight of 1010 and characterized by recurring units of which 3 out of 4 had the formula:

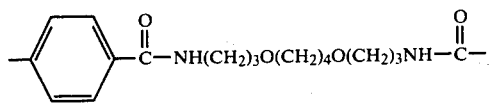

and the remainder had the formula:

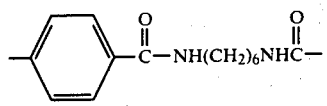

(b) A mixture of 30 g. (0.0297 equivalents) of the above prepolymer, 16 g. of poly(hexamethylene)adipate [same as Example 1, part (b)] and 0.45 g. of antioxidant (Irganox 1098) was heated to 210° C. under an atmosphere of nitrogen. When the mass became molten, a total of 0.5 g. of tetrabutyl titanate was added. Water began to distil out of the reaction mixture and continued at a fast rate for about 1 hour before slowing noticeably. At this time the pressure in the reaction vessel was reduced and the temperature was raised to 260° C. for a further hour and then to 270° C. for a final hour. At the end of this time the reaction product was poured on to a Teflon-lined tray and allowed to cool to ambient temperature (circa 20° C.). The resulting solid polymer was chopped to facilitate molding. There was thus obtained a polyesteramide having an intrinsic viscosity (0.5 g. in 100 ml. of N-methylpyrrolidone at 30° C.) of 0.68 and characterized by a recurring unit of formula (I) wherein R represents

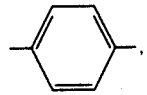

75 percent of the groups R' represent —(CH$_2$)$_3$O(CH$_2$)$_4$O(CH$_2$)$_3$— and the remaining 25 percent represent —(CH$_2$)$_6$—, and R" represents

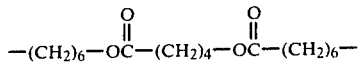

A sample of the above polyester-amide was compression molded at 220° C. to give a clear, light yellow sheet which was cured by heating for 3 hours at 140° C. and then found to have the following physical properties:

Hardness: Shore A: 92
Modulus at
 50%: 1780 psi
 100%: 1835 psi
 300%: 2170 psi

Elongation at break: 330%
Tensile Strength: 2245 psi
Tensile Set: 110%

EXAMPLE 3

Using the procedure described in Example 1, parts (a) and (b), but replacing the 1,4-bis(3-aminopropoxy)butane in part (a) by an equivalent amount of 1,3-bis(3-aminopropoxy)propane, 1,3-bis(3-amino-2-methylpropoxy)propane, or 1,4-bis(3-amino-2-methylpropoxy)butane, there are obtained the corresponding polyester-amides.

Similarly, using the procedure described in Example 1, parts (a) and (b), but replacing the terephthalic acid in part (a) by an equivalent amount of isophthalic acid or p-phenylene-bis(acetic acid) there are obtained the corresponding polyester-amides.

We claim:

1. Segmented thermoplastic polyester-amides characterized by a recurring unit of the formula:

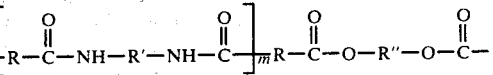

wherein

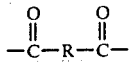

is the residue of a dicarboxylic acid selected from the class consisting of arylene dicarboxylic acids, alkylene dicarboxylic acids and arylenebis(alkanoic acids);

from 50 to 100 percent of the R's group in said recurring unit represent the residue of a diamine having the formula:

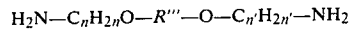

wherein C$_n$H$_{2n}$ and C$_{n'}$H$_{2n'}$ are each independently alkylene from 3 to 5 carbon atoms and R''' is alkylene having from 1 to 6 carbon atoms separating the valencies;

and from 50 to 0 percent of the R' groups in said recurring unit represent the residue of at least one aliphatic diamine having from 2 to 12 carbon atoms;

R" is the residue of a polymeric diol HO—R"—OH having a molecular weight from about 400 to about 4000;

and m is a number having an average value from about 1 to about 20.

2. A segmented thermoplastic polyester-amide according to claim 1 wherein 100 percent of the R' groups are the residue of 1,4-bis(3-aminopropoxy)butane.

3. A segmented thermoplastic polyester-amide according to claim 1 wherein from 50 to 100 percent of the R' groups are the residue of 1,4-bis(3-aminopropoxy)butane and the remainder are the residue of hexamethylene diamine.

4. A segmented thermoplastic polyester-amide according to claims 2 or 3 wherein

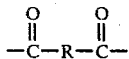

is the residue of terephthalic acid.

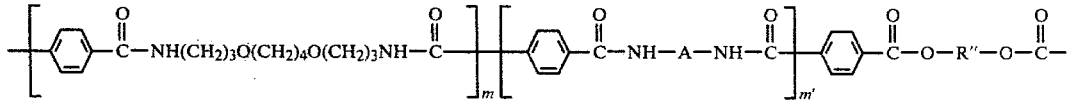

5. A segmented thermoplastic polyester-amide according to claim 1 wherein R" is the residue of a polyester diol.

6. A segmented thermoplastic polyester-amide according to claim 1 wherein R" is the residue of a polyether diol.

7. A segmented thermoplastic polyester-amide characterized by a recurring unit of the formula:

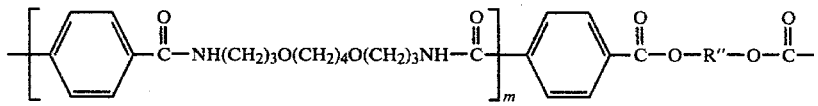

wherein R"0 is the residue of a polymeric diol having a molecular weight of about 400 to about 4000 and m is a number having an average value of about 1 to about 20.

8. A segmented thermoplastic polyester-amide according to claim 7 wherein R" is the residue of a polyester diol having a molecular weight in the range of about 1000 to about 3000.

9. A segmented thermoplastic polyester-amide according to claim 7 wherein R" is the residue of a polyether diol having a molecular weight in the range of about 1000 to about 3000.

10. A segmented thermoplastic polyester-amide characterized by a recurring unit of the formula wherein A is the residue of an alkylene diamine having from 2 to 12 carbon atoms, R" is the residue of a polymeric diol having a molecular weight in the range of about 400 to about 4000, m is a number having an average value of about 1 to about 20, and m' is a number from zero to m.

11. A segmented thermoplastic polyester-amide according to claim 10 wherein R" is the residue of a polyester diol having a molecular weight in the range of about 1000 to about 3000.

12. A segmented thermoplastic polyester-amide according to claim 10 wherein R" is the residue of a polyether diol having a molecular weight in the range of about 1000 to about 3000.

* * * * *

UNITED STATES PATENT OFFICE
CERTIFICATE OF CORRECTION

Patent No. 4,328,331     Dated May 4, 1982

Inventor(s) Augustin T. Chen, Robert G. Nelb II and Kemal B. Onder

It is certified that error appears in the above-identified patent and that said Letters Patent are hereby corrected as shown below:

Column 2, line 1 "inention" should read --invention--.
Column 8, claim 1, line 39 "R's group" should read
--R' groups--. Column 9, claim 7, line 28 "R''0 is"
should read --R" is--.

Signed and Sealed this

Thirteenth Day of July 1982

[SEAL]

Attest:

*Attesting Officer*

GERALD J. MOSSINGHOFF
*Commissioner of Patents and Trademarks*